United States Patent
Motohashi

[19]

[11] Patent Number: 6,009,310
[45] Date of Patent: Dec. 28, 1999

[54] RADIO SELECTIVE CALLING RECEIVER USING DIVERSITY RECEPTION

[75] Inventor: Teruyuki Motohashi, Shizuoka, Japan

[73] Assignee: NEC Corporation, Tokyo, Japan

[21] Appl. No.: 08/905,642

[22] Filed: Aug. 4, 1997

[30] Foreign Application Priority Data

Aug. 14, 1996 [JP] Japan ................................ 8-214609

[51] Int. Cl.⁶ .............................. H04B 7/00; H04B 1/16; H04B 1/04
[52] U.S. Cl. ........................ 455/38.3; 455/343; 455/134; 455/132
[58] Field of Search ..................................... 455/343, 383, 455/132–134, 101, 272, 269, 277.1, 277.2, FOR 343, FOR 38.3, FOR 2.72, FOR 132–134, FOR 269, FOR 277.1, FOR 277.2; 375/347

[56] References Cited

U.S. PATENT DOCUMENTS

| | | | |
|---|---|---|---|
| 5,390,357 | 2/1995 | Nobusawa et al. ................... | 455/134 |
| 5,530,926 | 6/1996 | Rozanski .................................. | 375/347 |
| 5,692,019 | 11/1997 | Chang et al. ............................ | 375/347 |
| 5,797,090 | 8/1998 | Nakamura ................................ | 455/343 |

FOREIGN PATENT DOCUMENTS 6-334572  12/1994  Japan .

Primary Examiner—William G. Trost
Assistant Examiner—Tracy M. Legree
Attorney, Agent, or Firm—Scully, Scott Murphy & Presser

[57] ABSTRACT

A radio selective calling receiver includes a field strength detection unit for detecting a received field strength, a first time diversity processing section for performing time diversity processing with a large time diversity effect and large power consumption, a second time diversity processing section for performing time diversity processing with a small time diversity effect and small power consumption, and a selection unit for determining, on the basis of a detection result from the field strength detection unit, whether the received field strength is high or low, and selecting the first time diversity processing section for a low field strength or the second time diversity processing section for a high field strength.

2 Claims, 1 Drawing Sheet

RADIO SELECTIVE CALLING RECEIVER USING DIVERSITY RECEPTION

BACKGROUND OF THE INVENTION

1. Field of the Invention

The present invention relates to a radio selective calling receiver and, more particularly, to a radio selective calling receiver using time diversity reception.

2. Description of the Prior Art

Time diversity reception is a measure against fading. In this technique, the transmission side transmits a signal string a plurality of number of times, and the reception side selects a high-quality one of the received plurality of identical signal strings. According to, e.g., Japanese Unexamined Patent Publication No. 6-334572, demodulated outputs of identical signals are sampled and stored. The absolute value of the sampled value of a received signal is compared to that of the preceding sampled value, and a signal having a larger value is selected.

As described above, conventionally, time diversity processing is always executed in units of bits independently of the reception level. Generally, to increase the time diversity effect, highly precise processing in units of bits is performed, although this increases the processing load to result in an increase in power consumption. For the conventional radio selective calling receiver which performs time diversity processing, the power consumption is large, and accordingly, the battery service life is short.

SUMMARY OF THE INVENTION

The present invention has been made to solve the above problem of the prior art, and has as its object to provide a radio selective calling receiver using diversity reception, which can save the power consumption to prolong the battery service life by selecting optimized time diversity processing in accordance with a reception level.

In order to achieve the above object, according to the basic aspect of the present invention, there is provided a radio selective calling receiver comprising field strength detection unit for detecting a received field strength, first time diversity processing section for performing time diversity processing with a large time diversity effect and large power consumption, second time diversity processing section for performing time diversity processing with a small time diversity effect and small power consumption, and selection means for determining, on the basis of a detection result from the received field strength detection unit, whether the received field strength is high or low, and selecting the first time diversity processing section for a low field strength or the second time diversity processing section for a high field strength.

In the above basic aspect, the first time diversity processing section performs time diversity processing in units of bits, and the second time diversity processing section performs time diversity processing in units of codeword codes.

Generally, when the reception level is high, high-quality reception can be performed independently of the time diversity processing method. In the radio selective calling receiver of the present invention, when the reception level is high, time diversity processing is performed in units of codeword codes with the small time diversity effect and small power consumption. When the reception level is low, time diversity processing is performed in units of bits with the large time diversity effect and large power consumption. In this manner, time diversity processing is selected in accordance with the reception level, thereby saving the power consumption of the battery.

As described above, according to the present invention, the plurality of time diversity processing sections are provided having different time diversity effects and power consumption amounts. A certain time diversity processing section is selected in accordance with the received field strength. With this arrangement, the power consumption can be saved to prolong the battery service life, and an optimized time diversity effect can be obtained.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENT

A preferred embodiment of the present invention will be described below with reference to the accompanying drawings.

Figure 1:
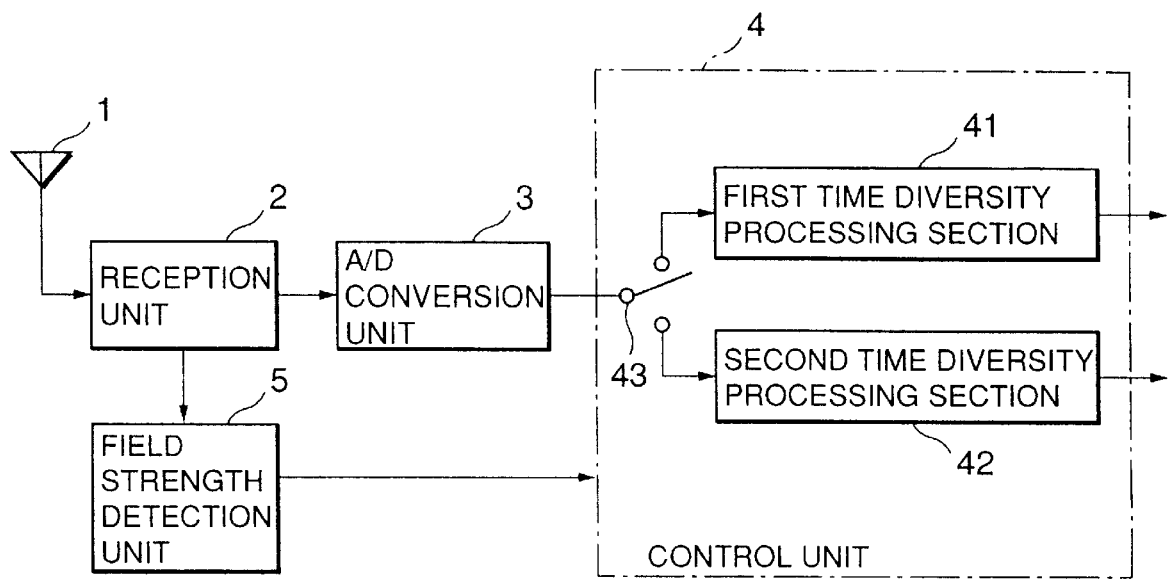
FIG. 1 is a block diagram showing the arrangement of an embodiment of the present invention.

FIG. 1 is a block diagram showing the arrangement of the embodiment of the present invention. A reception unit 2 demodulates a signal received via an antenna 1. An A/D conversion unit 3 converts a demodulated output into a digital signal and sends the signal to a control unit 4. A field strength detection unit 5 detects the reception level of the received signal and informs the control unit 4 of the detection result.

The control unit 4 has a first time diversity processing section 41 and a second time diversity processing section 42. The control unit 4 selects one of the time diversity means by a selection switch 43 in accordance with the detection result from the field strength detection unit 5 and executes time diversity processing.

The first time diversity processing section 41 executes time diversity processing in units of bits for the data values at all sampling points of the demodulated output digitized by the A/D conversion unit 3. Therefore, the first time diversity processing section 41 can perform highly precise processing, although the power consumption is large.

The second time diversity processing section 42 decodes the digitized demodulated data into codeword codes and executes time diversity processing in units of codeword codes. Since the second time diversity processing section 42 performs processing in units of codeword codes, the time diversity effect, i.e., the precision is lower than that of the first time diversity processing section 41, although the power consumption can be reduced.

Figure 2:
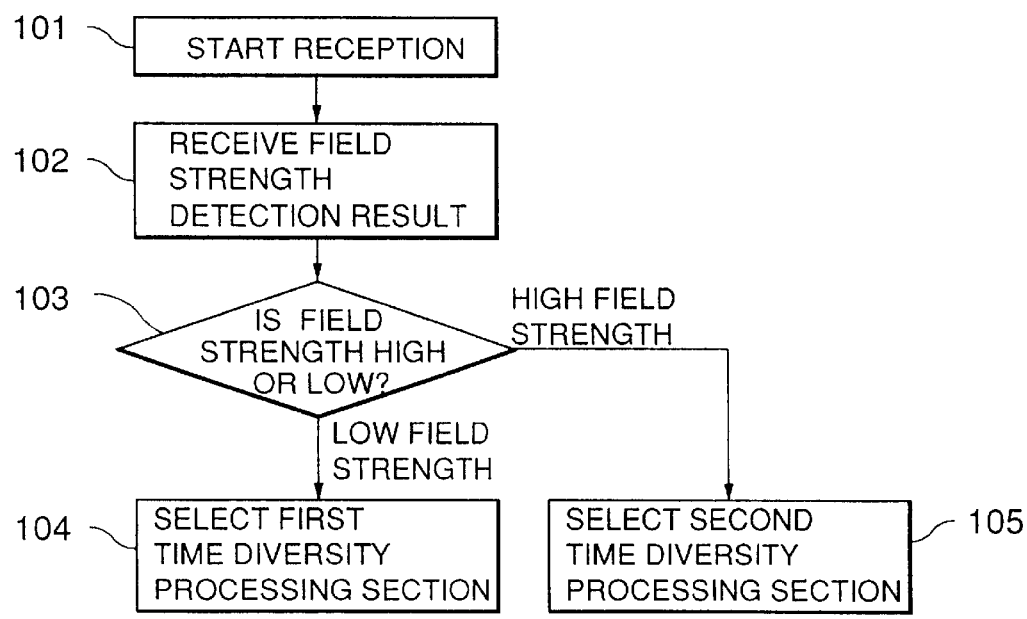
FIG. 2 is a flow chart showing the operation of a control unit in the embodiment shown in FIG. 1.

FIG. 2 is a flow chart showing the operation of the control unit 4 in the embodiment shown in FIG. 1.

At the start of reception (step 101), the control unit 4 receives the detection result from the field strength detection unit 5 (step 102), compares the detection result with a predetermined field strength to determine whether the field strength is high or low (0/1 determination) (step 103).

If it is determined that the field strength is low, the margin to the reception sensitivity is small. Accordingly, the first time diversity processing section 41 is selected by the selection switch 43, so that time diversity processing is performed in units of bits (step 104).

If it is determined that the field strength is high, the margin to the reception sensitivity is large, and therefore, high-quality reception can be performed. The second time diversity processing section 42 is selected to perform processing in units of codeword codes (step 105).

What is claimed is:

1. A radio selective calling receiver comprising:

field strength detection means for detecting a received field strength;

first time diversity processing means for performing time diversity processing with a large time diversity effect and large power consumption;

second time diversity processing means for performing time diversity processing with a small time diversity effect and small power consumption; and selection means for determining, on the basis of a detection result from said received field strength detection means, whether the received field strength is high or low, and when the reception level is high, the second time diversity processing means is selected with the small time diversity effect and small power consumption, thereby saving power consumption of the battery, and when the reception level is low, the first time diversity processing means is selected with the large time diversity effect and large power consumption.

2. A receiver according to claim 1, wherein said first time diversity processing means performs time diversity processing in units of bits, and said second time diversity processing means performs time diversity processing in units of codeword codes.

* * * * *